Dec. 14, 1943.  W. L. BURKHARD  2,336,594
BELT LENGTH FINDER
Filed May 4, 1943  2 Sheets-Sheet 1
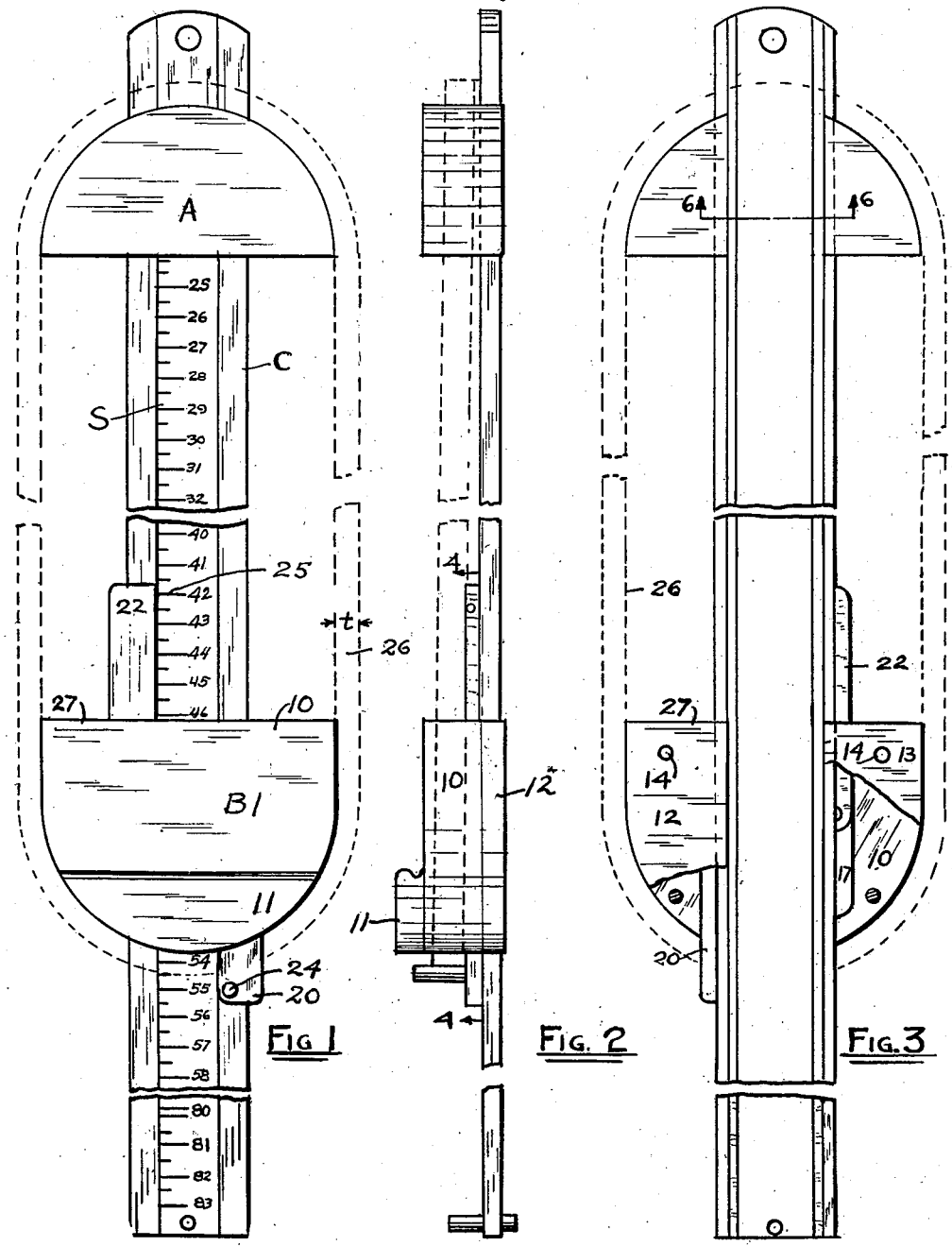
WILLIAM L. BURKHARD
INVENTOR.
BY Martin E Anderson
Attorney Dec. 14, 1943.    W. L. BURKHARD    2,336,594
BELT LENGTH FINDER
Filed May 4, 1943    2 Sheets-Sheet 2
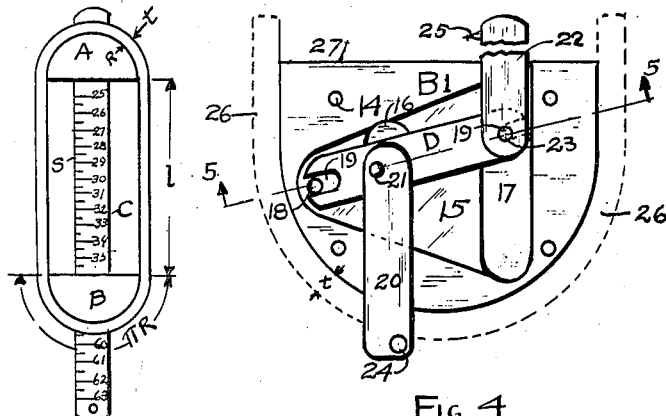
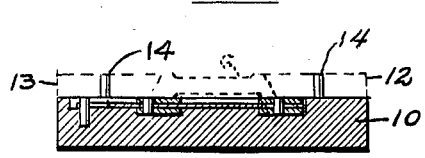
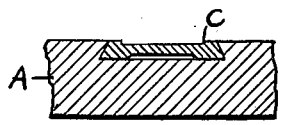
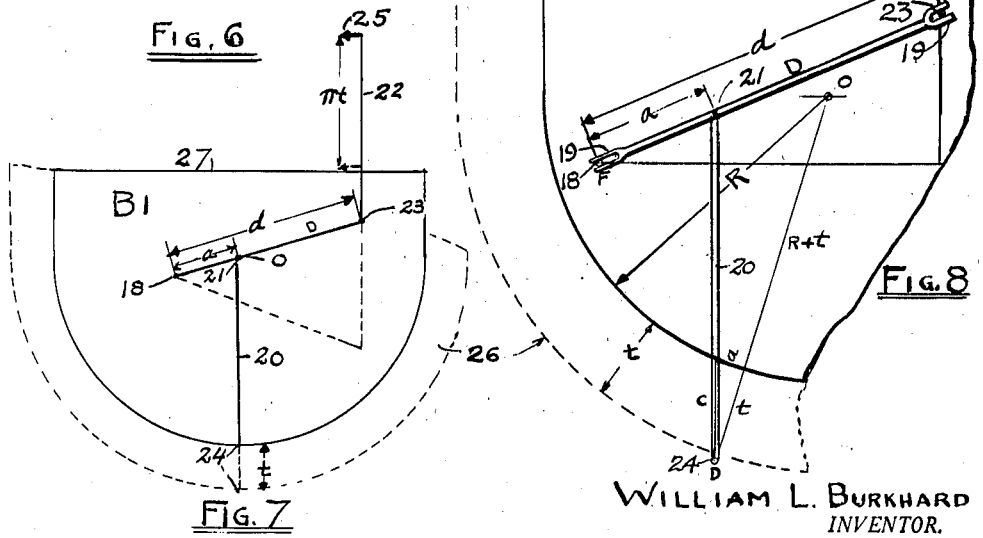
WILLIAM L. BURKHARD
INVENTOR.
BY Martin E. Anderson
Attorney Patented Dec. 14, 1943

2,336,594

UNITED STATES PATENT OFFICE 2,336,594

BELT LENGTH FINDER

William L. Burkhard, Denver, Colo., assignor to The Gates Rubber Company, Denver, Colo., a corporation of Colorado Application May 4, 1943, Serial No. 485,666

7 Claims. (Cl. 33—125)

This invention relates to improvements in belt length finders, or measuring devices.

At the present time belt drives are very popular, and V-belt drives, either single or multiple, have to a large extent replaced spur gears and sprocket chains.

The popular V-type belts, of those sizes adapted for use in places where the pulley centers are not separated too far, are manufactured in endless form, and supplied in a great variety of lengths and sizes.

It is standard practice among manufacturers of light duty V-belts to use the outside circumference as the standard of length measurement, and this length is usually indicated by the belt number.

For various reasons which need not be explained herein, and more particularly for determining the outside circumference for marking, where this is necessary, it has been found to be necessary to produce an instrument or device by means of which the outside circumference can readily be obtained.

The inside circumference of a V-belt, or a flat belt, can be measured by means of a simple device which will be hereinafter described. Since V-belts are usually of considerable and of various thickness, it is evident that the outside circumference is greater than the inside by an amount equal to the thickness multiplied by two times pi or where the thickness is $t$ the difference between the inside and the outside circumferences is $2t \times 3.1416$.

It is the object of this invention to produce a belt length finder that will automatically indicate the correct outside circumference of any belt of any thickness.

Having explained the objects of the invention, the apparatus embodying the invention will now be described and for this purpose reference will be had to the accompanying drawings in which the invention has been illustrated, and in which:

Figure 1 is a front plan view of the device forming the subject of the invention;

Figure 1A is a front plan view of a similar device for measuring the inside circumference of a belt;

Figure 2 is a side elevation of the device shown in Figure 1;

Figure 3 is a rear plan view of the device shown in Figure 1;

Figure 4 is a view looking in the direction of arrows 4—4, Figure 2, and shows the mechanism employed for determining the additional amount necessary to compensate for thickness;

Figure 5 is a section taken on line 5—5, Figure 4;

Figure 6 is a section taken on line 6—6, Figure 3;

Figure 7 is a diagram illustrating the principle of the mechanism; and

Figure 8 is another diagram, similar to that shown in Figure 7, and illustrates the actual mechanism employed.

The inside circumference of any belt can readily be determined by means of a simple device like that shown in Figure 1A, where A and B designate two semi-circular blocks of wood. Block A is fixed immovably on a stick C carrying a scale S. Block B is slidably connected with the stick. If the radius of the blocks is represented by R and the distance between the centers of the blocks by L then the inside circumference will be $2L+2$ pi $R$. By graduating the scale so that each major division is one-half inch the factor 2 can be eliminated. The smallest belt that can be measured by such a device is one having an inside circumference of 2 pi R or the circumference of the two blocks A and B and for each two additional inches in length the centers of the blocks are separated one inch and therefore by reducing the scale on the stick to one-half, each major division will indicate an additional inch in the inside circumference of the belt. The diameter line of block A must therefore represent 2 pi R inches and if we consider that the minimum inside circumference of a belt to be measured is 24 inches then 2 pi $R=24$ and $R=12+$pi, or approximately 3.8 inches. The diameter line of block A has therefore been designated by 24. Any desired radius can, however, be used and the scale adjusted with respect to the block to get the correct reading. The simplest way is to surround blocks A and B with a belt of known inside circumference or length and adjust the scale accordingly. The outside length or circumference of a belt having a thickness of $t$ is greater than the inside by an amount equal to 2 pi $t$ and is, of course, independent of the diameters of blocks A and B.

Referring still to Figure 1A, the inside circumference is $2L+2$ pi $R$ and the outside circumference is $2L+2$ pi $R+2$ pi $t$. Since the inside length, $2(L+$pi $R)$ can be readily determined it is the factor 2 pi $t$ that must be compensated for. It is possible to provide a table which gives the amount to be added to the inside circumference for each thickness as this varies directly with the thickness, 2 pi being constant.

As previously stated, the object of this invention is to provide a device that will read the outside circumference directly thereby simplifying the length finding operation.

Since the scale has its inch marks spaced one-half inch apart, the constant becomes pi and it is merely necessary to move the pointer 3.14 times the thickness of the belt to make the necessary adjustment.

The easiest way to effect the desired correction is to employ a system of levers which will now be explained.

Figures 1, 2 and 3 show the improved device in which the stationary block A is attached to the upper end of the scale stick C. The lower block B1 is slidable on the stick but is constructed in a slightly different manner. Block B1 is made in several parts, the main part thereof being designated by numeral 10, a sector shaped member 11 is glued to the outer surface, but has no bearing on the operation. Two members 12 and 13 are secured to the undersurface of the block by dowel pins 14. The adjacent edges of blocks 12 and 13 are beveled to receive the stick C in the manner shown in Figure 5. The under surface of block B1, which is shown in Figure 4, is provided with a depression 15 that is roughly triangular and with two parallel grooves 16 and 17 positioned on opposite sides of the center. A pivot pin 18 is positioned in the vertex to the left. A lever D is provided at its opposite ends with notches 19. A slide 20 is positioned in groove 16 and connected with lever D by a pivot 21. A second slide, 22, is positioned in groove 17 and carries a pivot pin 23 that passes through the notch 19. It is now evident that when slide 20 is moved upwardly, or downwardly, slide 22 will also move but to a greater extent than slide 20, depending on the ratio of the lever arms 18—21, and 18—23. If we designate the former by $a$ and the latter by $d$ the relative distances that slides 20 and 22 will move is as $a:b$. If we select the lever arms so that $b \div a$ equals 3.14 or pi, then for every unit of distance, the pin 24, in slide 20, moves the pointer 25 will move 3.14 units and therefore if pin 24 moves a distance of $t$, pointer 25 will move $3.14t$ units.

In Figures 1, 2, 3 and 4, pin 24 is shown in contact with a belt 26 whose thickness is $t$ and the pointer 25 has therefore been moved downwardly a distance of $3.14t$ units.

In Figure 7, the system of levers has been shown diagrammatically and reference will now be had to that figure. In Figure 7, the slide 20 has been shown as positioned on a radius perpendicular to side 27 of block B1 and pivot 21 will therefore move over the center 0. When pin 24 moves the distance $t$, pointer 25 will move $pi \times t$ or $dt \div a$. By having pin 24 and pivot 21 on a radius, the relative movements of 24 and 25 will be absolutely proportional to the belt thickness.

For practical reasons the slide 20 is placed to one side of the center 0 and moves along a chord instead of a radius and this has been illustrated in Figure 8. It is evident that in the actual construction pin 24 will move diagonally across the belt instead of at right angles thereto and the line $c$ is therefore slightly longer than $t$, being the hypothenuse of the triangle $atc$, however, the difference is so small as to be negligible because a slight difference in the tension of the belt will cause a greater error.

It is believed that an inspection of Figure 8 will show that the difference of length between the base $t$ and the hypothenuse is very small and a mathematical demonstration will not be made, suffice it to say that the angle is about 17° and since $$\frac{t}{c} = \cos 17°; \; t = .956c \text{ or } c = t \div .956$$

if we consider $t$ as one inch $c$ will equal 1.05, and .05 multiplied by pi will still be less than .2 of an inch.

In the apparatus illustrated and described the pin 24 and the pointer 25 are interconnected by means of a lever but gears or any other equivalent means for effecting the same function may be substituted. In the actual construction the unit of measure is the inch, the major divisions being spaced one-half inch, it is evident, of course, that any other unit such as a centimeter can be employed and the term "inch" is therefore to be understood as covering any other unit. Blocks A and B are preferably shaped as shown and since only one-half the circumference comes in contact with the belt they are referred to as "semi-circular" blocks.

On the back of the stick C there is usually a table giving belt numbers and groups but since this does not concern the mechanism claimed, it has not been shown.

In order to eliminate the slight error due to the position of the pin 24 it is only necessary to position it on a lateral extension of slide 20 so as to bring it on a diameter, or into the position shown in Fig. 7.

Having described the invention what is claimed as new is:

1. A belt length finder for determining the outside circumference of a belt comprising, means for dividing the belt into two semi-circular arcs of known length and two straight sides whose lengths are determined by means of a graduated scale, the sum of the two arcs and the lengths of the straight portions giving the inside circumference of the belt, means for measuring the thickness of the belt, and means for indicating on the scale the total length of the belt comprising a pointer movable in response to the thickness of the belt and at a ratio of 3.14 times the thickness, whereby the reading of the scale will give the outside circumference of the belt.

2. A device for automatically indicating the length of the outside circumference of an endless belt having a thickness $t$, comprising a block, a slide movable relative thereto, a pin carried by the slide for movement into contact with the surface of a belt positioned between the pin and the block, a scale graduated in one-half inch units, associated with the block, a pointer movably connected with the block and with the scale, and motion transmitting means between the slide and the pointer for moving the latter 3.14 times as far as the pin, whereby the movement of the pointer along the scale will represent the value of 2 pi $t$.

3. A device for measuring the outside circumference of belts comprising, in combination, a stick having its length divided into spaces, each one-half unit in length, a semi-circular block fixedly attached to the stick near one end, a similar block attached to the stick for movement relative to the stick, the convex sides of the blocks being oppositely related, the blocks being adapted to receive a belt and form it into two semi-circular arcs and two parallel straight portions, whereby the inside circumference of the belt can be determined by adding the sum of two arcuate sections to twice the distance between the centers of the blocks, and means for automatically indicating on the graduation of the scale on the stick the outside circumference of belts having thickness $t$ which comprises, a slide having a pin movable towards and away from the arcuate portion of one block and into engagement with the outer surface of the belt, a pointer movable along the scale in the same direction as the pin, and means interconnecting the slide and the pointer to effect a relative movement, whereby the pointer will move a distance of 3.14 units for each unit moved by the slide and pin.

4. A device for determining the outside circumference of a belt of thickness $t$ comprising a straight stick having a scale whose major divisions are spaced one-half inch apart, two semi-circular blocks carried by the stick, one being immovably secured and the other slidably secured thereto, the length of the inside of a belt encircling the two blocks being equal to the sum of the semi-circumferences of the blocks plus twice the distance between their centers, and means for adding to the reading a distance equal to pi $t$, said means comprising a pin mounted for movement relative to the arcuate surface of one block, for engagement with the outside of the belt, a pointer movable along the scale, and means for imparting to the pointer a movement 3.14 times that of the pin, whereby the pointer will add to the reading on the scale a distance equal to $3.14t$, or the difference between the inside and the outside circumferences of the belt.

5. A device for finding the outside circumference of a belt of thickness $t$, comprising a stick having a scale graduated in units of one-half inch, a semi-circular block secured to one end thereof, another similar block slidably connected with the stick, a slide carrying a pointer, attached to the last named block for movement parallel to the stick, a second slide attached to the last named block for movement parallel to the first, a lever connecting the two slides, the lever having one end pivoted to the block, the last named slide being pivoted to the lever between its pivot and the first named slide which is also pivoted to the lever, the ratio between the lever arm of the first slide and that of the second slide being approximately 3.14, the second slide having a pin adapted to contact the outer surface of a belt positioned between it and the block whereby the movement of the pointer along the scale will equal 3.14 that of pin, the pointer and the pin moving in the same direction.

6. A device for determining the outside circumference of an endless belt having a thickness $t$, by a single setting, comprising a stick having a scale graduated in one-half inch units, a semi-circular block attached to the stick near one end, another similar block movably connected with the stick, the first graduation adjacent the stationary block being designated by a number which indicates the minimum inside circumference of a belt that can encircle the blocks, the movable block having a pointer movable along the scale, and mounted for movement relative to the block, a slide connected with the movable block for moving in a line parallel with a line joining the centers of the blocks, a pin carried by the slide for movement into engagement with the outer surface of a belt encircling the blocks, and a movement multiplying device interconnecting the slide and the pointer for moving the pointer and the pin in the same direction, the pointer moving 3.14 times as far as the pin, whereby the movement of the pointer will add to the scale reading the difference between the inside and outside circumferences.

7. A device for determining at a single reading the outer circumference of an endless belt having a thickness $t$ which comprises two semi-circular blocks mounted for relative movement along a line containing the radial bisector, a scale graduated in half-inch units for determining the distance between the centers of the block, the first graduation having a value of the sum of the semi-circumferences of the blocks, whereby the reading of the scale from any position of the blocks will be equal to the inside circumference of the belt, and means for automatically adding to the scale reading the difference between the inside and the outside circumferences, said means comprising a pin movable relative to the arcuate surface of one block and into engagement with the outer surface of the belt, a pointer movable along the scale, and a mechanism interposed between the pin and the pointer for multiplying its travel relative to that of the pin by 3.14.

WILLIAM L. BURKHARD.